Patented Jan. 12, 1932

1,840,413

UNITED STATES PATENT OFFICE

ERNST SCHMIDT, OF ARNAU-ON-THE-ELBE, CZECHOSLOVAKIA

METHOD OF PRODUCING HIGH-GRADE CELLULOSE FROM WOOD, STRAW, GRASSES, AND OTHER VEGETAL MATERIALS

No Drawing. Application filed December 26, 1929, Serial No. 416,738, and in Czechoslovakia July 11, 1928.

The object of the invention is the production of high-grade cellulose from wood, straw, grass and other vegetal materials, more particularly from such matter that has, up to the present, been impossible or difficult to dissolve by the sulphite process.

Hitherto it has been found that hard woods and other vegetal materials rich in resins and silica cannot be satisfactorily and completely worked by the sulphite process. According to the present invention, small quantities of one or more given sulfates, which are not members of the alkali or alkaline earth groups, for example, sulfates of iron, silver, copper, aluminium, zinc, tin, lead, cobalt, nickel, chromium, manganese or their salts and oxides are added to the boiling lye. It has been found that the addition of such sulphates not only eliminates the difficulties hitherto encountered in connection with the working of certain vegetables but further insures, by comparison with the normal sulphite process, an acceleration and greater efficiency in the working.

In all the previously known sulphite processes for the manufacture of cellulose, the boiling lye consists exclusively of calcium and magnesium bisulphite solution with the usual quantity of gas lye which contains the waste gases or condensate drained and collected upon pressure reduction during the boiling and used for strengthening and improving the tower lye, and contains organic acids, aldehydes, alcohols and the like. On the contrary according to the invention, the normal boiling lye has added to it, a certain quantity of a water soluble sulfate such as aluminium, nickel or zinc sulphate. Said quantity depends on the constituents of the gas lye and in those cases, which are theoretically difficult to work, on the type and nature of the material to be boiled. As example, approximately 20 to 100 kilograms of these materials are added to 100 cubic meters of cooking lye according to the nature and properties of the boiling material to be treated. The addition is made, preferably, directly to the gas lye.

The invention is not restricted to the above example, it being immaterial in what manner and at what point of the working process the material to be boiled is treated with the added substances.

I claim:

1. Method of making high grade cellulose from wood, straw, grasses, and other vegetal materials, particularly such as are indissoluble or but difficultly soluble in the normal sulfite process, with this characteristic feature that in addition to the normal boiling lye, at least one water soluble sulfate, belonging neither to the group of alkalies nor to the group of alkali earths, is brought to act upon the boiling material.

2. Method according to claim 1, with this characteristic feature that the sulfate in question is added directly to the gas lye serving for the reinforcement or improvement of the tower lye and becoming available during the boiling process.

In testimony whereof I affix my signature.

ERNST SCHMIDT.